US005937372A

United States Patent [19]
Gould

[11] Patent Number: 5,937,372
[45] **Date of Patent: *Aug. 10, 1999**

[54] METHOD OF ESTIMATING PRECISION OF APPARATUS

[76] Inventor: Gregory Gould, 2 Lilac Place, Thornwood, N.Y. 10594-2102

[ * ] Notice: This patent issued on a continued prosecution application filed under 37 CFR 1.53(d), and is subject to the twenty year patent term provisions of 35 U.S.C. 154(a)(2).

[21] Appl. No.: 08/905,196

[22] Filed: Aug. 1, 1997

Related U.S. Application Data

[63] Continuation-in-part of application No. 08/761,564, Dec. 6, 1996, abandoned.

[51] Int. Cl.$^{6}$ .................................................... G06F 15/00
[52] U.S. Cl. ............................................ 702/181; 702/60
[58] Field of Search .................................. 364/554, 492, 364/511, 552, 422; 166/272, 292, 117.5; 702/60–64, 181

[56] References Cited

U.S. PATENT DOCUMENTS 5,072,387 12/1991 Griston et al. .......................... 364/422

*Primary Examiner*—Kamini Shah
*Attorney, Agent, or Firm*—John L. Gray; Kegler, Brown, Hill & Ritter

[57] ABSTRACT

A method of estimating the precision of an apparatus that generates a continuous stream of information. The method comprises dividing the information in successive or overlapping pairs and calculating an index of precision therefrom for evaluation against a benchmark such as a standard value, a specification, or a contract requirement. Calculations can be done by a microprocessor and microprocessor instructions internal to the instrument or by a microprocessor and microprocessor instruction external to the instrument. The microprocessor instructions comprise any of various standard mathematical algorithms which return an estimated index of precision.

3 Claims, No Drawings

METHOD OF ESTIMATING PRECISION OF APPARATUS

This application is a continuation-in-part of 08/761,564 filed Dec. 6, 1996, abandoned.

BACKGROUND OF THE INVENTION

With the development of apparatus enabling automatic analysis of various substances, such as the nuclear analyzer, there is a need for estimating the precision of such apparatus. The current accepted manner of doing this is the labor intensive batch mode bias test using a three instrument Grubbs Estimators experimental design to obtain estimates of instrument precision and bias.

This test is based on the laws of propagation of error. By making simultaneous measurements with three "instruments" and appropriate mathematical manipulation of sums and differences of these measurements, one can obtain estimates of the variance of measurement precision associated with each of the three "instruments" for the batch size used for the test. Two of the "instruments" comprise instruments made by conventional sampling and testing and the third "instrument" is the measurements made by the particular instrument being tested. The Grubbs Estimators procedure does not separate instrument precision from product variability. It provides an estimate only of overall precision and size, the estimated precision is batch size specific, product variability specific, particle size distribution specific, and bulk density specific. This approach also lacks instancy and immediacy of results.

SUMMARY OF THE INVENTION

The applicant's method of estimating the precision of an apparatus avoids the drawbacks of the Grubbs Estimators test technique and provides additionally an estimate of the fourth source of variance, namely, product variability. This is accomplished by taking successive pairs of information obtained by the analyzer and calculating the index of precision from said pairs. As used herein said successive pairs of information shall include overlapping or non overlapping data, and each member of said successive pairs of information may consist of various combinations (such as averages, medians, mean squares, and the like) of multiple data items.

This calculation may be performed in accordance with the following formula:

$$Va = \sum \frac{d^2}{2n}$$

Where

Va=variance of precision of a single member of a pair d=difference between members of pairs n=number of differences

DETAILED DESCRIPTION OF THE INVENTION

The invention will be described with respect to the estimation of the precision of an on-line nuclear analyzer. However, it should be understood that the invention is applicable to any piece of apparatus which generates, internally or externally, a continuous stream of information. This perhaps can best be illustrated by an application of the method to the estimation of the precision of a gamma metrics model 1812 C on-line nuclear analyzer installed in the coal blending facility of Central Illinois Lighting Company. By practicing the method of the present invention, precision estimates of the measurements made by the on-line nuclear analyzer, and estimates of product variability (variance) on-the-fly in real time from the information generated by the analyzer. It is also possible to make a continuous assessment of bias relative to physical samples collected by a mechanical sampling system. In the case of the Central Illinois Lighting Company (Cilco), the batch-mode bias test was comprised of thirty batches. The batches averaged slightly over 42 minutes of flow and ranged from a low of 36 minutes to a high of 50 minutes. Table 1 shows what the flow in terms of one minute ash observations look like during the Cilco test (see column 1), as well as a classical single classification Model I Analysis of Variance calculation of the estimated one minute index of precision expressed in terms of the statistical parameter known as a variance.

TABLE 1

| | | | Cilco Test Batch No. 1 As Received ash | | | |
|---|---|---|---|---|---|---|
| Stratum | Reading A | Reading B | RowSum | RowSum$^2$ | A$^2$ | B$^2$ |
| 1 | 8.1256 | 7.1125 | 15.2381 | 232.1997 | 66.02538 | 50.58766 |
| 2 | 8.3013 | 6.0229 | 14.3242 | 205.1827 | 68.9116 | 36.2753 |
| 3 | 7.5154 | 7.8518 | 15.3672 | 236.1508 | 56.4812 | 61.6508 |
| 4 | 7.7123 | 7.4551 | 15.1674 | 230.0500 | 59.4796 | 55.5785 |
| 5 | 6.4899 | 6.3351 | 12.8250 | 164.4806 | 42.1188 | 40.1335 |
| 6 | 7.8400 | 7.7831 | 15.6231 | 244.0813 | 61.4656 | 60.5766 |
| 7 | 5.4034 | 6.6789 | 12.0823 | 145.9826 | 29.1967 | 44.6077 |
| 8 | 7.2469 | 6.9645 | 14.2114 | 201.9639 | 52.5176 | 48.5043 |
| 9 | 8.1800 | 7.1952 | 15.3752 | 236.3968 | 66.9124 | 51.7709 |
| 10 | 7.2414 | 8.0728 | 15.3142 | 234.5247 | 52.4379 | 65.1701 |
| 11 | 6.9948 | 4.6114 | 11.6062 | 134.7039 | 48.9272 | 21.2650 |
| 12 | 7.2861 | 7.1645 | 14.4506 | 208.8198 | 53.0873 | 51.3301 |
| 13 | 6.8290 | 7.2253 | 14.0543 | 197.5233 | 46.6352 | 52.2050 |
| 14 | 8.8405 | 8.8031 | 17.6436 | 311.2966 | 78.1544 | 77.4946 |
| 15 | 5.9030 | 7.6675 | 13.5705 | 184.1585 | 34.8454 | 58.7906 |
| 16 | 7.9576 | 6.3456 | 14.3032 | 204.5815 | 63.3234 | 40.2666 |
| 17 | 6.1167 | 8.9458 | 15.0625 | 226.8789 | 37.4140 | 80.0273 |
| 18 | 7.4928 | 5.2926 | 12.7854 | 163.4665 | 56.1421 | 28.0116 |
| 19 | 6.1381 | 7.2661 | 13.4042 | 179.6726 | 37.6763 | 52.7962 |

TABLE 1-continued

| Stratum | Reading A | Reading B | RowSum | RowSum$^2$ | A$^2$ | B$^2$ |
|---|---|---|---|---|---|---|
| | | | Cilco Test Batch No. 1 As Received ash | | | |
| 20 | 6.4099 | 7.0312 | 13.4411 | 180.6632 | 41.0868 | 49.4378 |
| 21 | 6.5962 | 6.2539 | 12.8501 | 165.1251 | 43.5099 | 39.1113 |
| n | 21 | | | | | |
| N | 42 | | | | | |
| Sum | 150.6209 | 148.0789 | 298.6998 | 4287.9024 | 1096.3487 | 1065.5914 |
| | ΣX | 298.6998 | | | | |
| | ΣX$^2$ | 2161.9401 | | | | |
| | (ΣX)$^2$ | 89221.5705 | | | | |
| | (ΣX)$^2$/N = cf | 2124.3231 | | | | |
| | RowSum$^2$/2 - cf | 19.6281 | | | | |
| | Total | 37.6170 | | | | |

ANALYSIS OF VARIANCE

| | SS | df | Ms | Estimate |
|---|---|---|---|---|
| Between Stratum | 19.6281 | 20 | 0.9814 | Vi + 2 Vpd |
| Within Stratum | 17.9889 | 21 | 0.8566 | Vi |
| Total | 37.6170 | 41 | | |
| | | | 0.1248 | 2 Vpd |
| | | | 0.0624 | Vpd |

While the average was around 7%, the range varied from around 4% to 11%. Taking this range to represent 4 standard deviations, the coefficient of variation would be about 25%. Referring to Table 1, using 30 batches with the analyzed data sorted into 2 minute strata of adjoining 1 minute readings for each of the determinations "as received ash" and "as received sulphur" are set forth. Next, a single classification analysis of variance was performed on each batch as shown in Table 1 from which was obtained the within strata variance. The within strata variance is a pooled variance, i.e., the average variance estimate of a single member of a pair observation for that batch. For batch number 1, this value for as received ash was 0.8566.

Table 2 is a tabulation of the estimates of instrument precision variance for each of the 30 batches for ash and sulphur on an as received basis.

TABLE 2

| | Replicate Observations Within Stratum Variances | |
|---|---|---|
| | As Rc'd Ash | As Rec'd Sul |
| 1 | 0.8566 | 0.0210 |
| 2 | 1.0060 | 0.0201 |
| 3 | 0.8535 | 0.0191 |
| 4 | 0.6141 | 0.0261 |
| 5 | 0.6815 | 0.0273 |
| 6 | 0.6470 | 0.0162 |
| 7 | 0.6306 | 0.0256 |
| 8 | 0.9097 | 0.0184 |
| 9 | 1.1224 | 0.0245 |
| 10 | 0.9097 | 0.0199 |
| 11 | 1.4831 | 0.0392 |
| 12 | 0.9257 | 0.0282 |
| 13 | 1.0058 | 0.0247 |
| 14 | 1.4279 | 0.0372 |
| 15 | 1.0612 | 0.0240 |
| 16 | 0.3843 | 0.0342 |
| 17 | 0.7617 | 0.0167 |
| 18 | 0.4258 | 0.0298 |
| 19 | 0.8091 | 0.0111 |
| 20 | 0.7882 | 0.0112 |

TABLE 2-continued

| | Replicate Observations Within Stratum Variances | |
|---|---|---|
| | As Rc'd Ash | As Rec'd Sul |
| 21 | 0.6335 | 0.0137 |
| 22 | 0.8406 | 0.0251 |
| 23 | 0.5937 | 0.0285 |
| 24 | 0.7421 | 0.0199 |
| 25 | 0.9272 | 0.0233 |
| 26 | 0.6296 | 0.0420 |
| 27 | 1.3545 | 0.0264 |
| 28 | 0.5717 | 0.0499 |
| 29 | 1.0281 | 0.0344 |
| 30 | 0.5880 | 0.0194 |
| Max | 1.4831 | 0.0499 |
| Min | 0.3843 | 0.0111 |
| Avg | 0.8404 | 0.0252 |

The grand average at the foot of each column is the full test estimate of the instrument average precision variance of a single one minute member of a pair. A comparison with the values obtained by the Grubbs Estimators immediately shows the implication of applicant's invention expressed in terms of measurement precision. Applying the Grubbs Estimators Procedure to exactly the same data, the following results were obtained.

| Determination | Grubbs Estimators | Stratified Replicate Observations | F Ratio |
|---|---|---|---|
| As Rec'd Ash | 0.311 | 0.142 | 4.80 |
| As Rec'd Sulfur | 0.034 | 0.025 | 1.85 |

It is noted that on-average of the Grubbs Estimators test results might be expected to yield variance estimates as much as 300% larger than that obtained by applicant's invention.

While this invention has been described in its preferred embodiment, it must be realized that variations therefrom may be made without departing from the true scope and spirit of the invention.

What is claimed is:

1. A method of estimating the precision of an apparatus that generates a continuous stream of information, internally or externally, which comprises dividing said information into successive pairs of said information, then calculating the index of precision(.), and then evaluating said index of precision against a benchmark such as a standard value, a specification, or a contract requirement.

2. The method of claim 1 wherein the apparatus is an on-line nuclear analyzer.

3. The method of claim 2 where the calculation is performed in accordance with the following formula:

$$V_a = \sum \frac{d^2}{2n}$$

Where

Va=Variance of Precision of a single member of a pair d=Difference between members of pairs n=number of differences.

* * * * *

UNITED STATES PATENT AND TRADEMARK OFFICE

CERTIFICATE OF CORRECTION

PATENT NO. : 5,937,372

DATED : August 10, 1999

INVENTOR(S) : Gregory Gould

It is certified that error appears in the above-identified patent and that said Letters Patent is hereby corrected as shown below:

Column 4, paragraph 1, (below Table 2 - continued), line 3, delete "one minute".

Signed and Sealed this

Thirtieth Day of May, 2000

Attest:

Q. TODD DICKINSON

Attesting Officer

*Director of Patents and Trademarks*